United States Patent [19]

Stephenson

[11] Patent Number: 5,802,413
[45] Date of Patent: Sep. 1, 1998

[54] PRINTER RECEIVING ELECTRONIC CAMERA

[75] Inventor: Stanley W. Stephenson, Spencerport, N.Y.

[73] Assignee: Eastman Kodak Company, Rochester, N.Y.

[21] Appl. No.: 933,323

[22] Filed: Sep. 18, 1997

[51] Int. Cl.⁶ .......................... G03B 29/00; G03B 17/50
[52] U.S. Cl. .................. 396/429; 396/33; 358/906; 358/909.1; 355/18
[58] Field of Search ...................... 396/30, 33, 374, 396/429, 430; 358/302, 401, 501, 906, 909.1; 348/552; 355/18, 44, 45, 66

[56] References Cited

U.S. PATENT DOCUMENTS

| | | | |
|---|---|---|---|
| 4,262,301 | 4/1981 | Erlichman | 358/906 |
| 4,937,676 | 6/1990 | Finelli et al. | 358/906 |
| 5,032,911 | 7/1991 | Takimoto | 396/429 |
| 5,164,751 | 11/1992 | Weyer | 396/430 |
| 5,493,409 | 2/1996 | Maeda et al. | 396/429 |
| 5,715,234 | 2/1998 | Stephenson et al. | 396/429 |

*Primary Examiner*—A. A. Mathews
*Attorney, Agent, or Firm*—Raymond L. Owens

[57] ABSTRACT

Apparatus for capturing and printing images on photosensitive sheets includes an electronic camera having a display; and an image sensor means for producing a digital image of a subject. In response to the digital image, the electronic camera displays an image on the display. The printer includes a light tight storage structure for receiving the photographic sheets. The printer receives the electronic camera and includes optics for focusing the image on the display along a single optical path onto a photosensitive sheet at an exposure position. The printer further includes a shutter member having a shutter aperture for controlling the aperture to cause light from the display image to illuminate the photosensitive sheet.

5 Claims, 3 Drawing Sheets

PRINTER RECEIVING ELECTRONIC CAMERA

CROSS REFERENCE TO RELATED APPLICATIONS

The present invention is related to commonly assigned U.S. patent application Ser. No. 08/824,694, filed Apr. 8, 1997 (75543); U.S. patent application Ser. No. 08/778,233, filed Jan. 8, 1997 (74994), now U.S. Pat. No. 5,715,493; U.S. patent application Ser. No. 08/792,341, filed Jan. 31, 1997, now U.S. Pat. No. 5,715,492; and U.S. patent application Ser. No. 08/866,880 (75993), filed May 30 1997. The disclosure of these related applications is incorporated herein by reference.

FIELD OF THE INVENTION

The present invention relates to electronic cameras and to the printing of images produced by such cameras.

BACKGROUND OF THE INVENTION

It is known to provide an electronic camera which uses an area image sensor. Digital images produced from the image sensors are stored in memory and these images can be shown on a display so that the user can determine which image should be stored for use in producing hard copy images. Typically, these images can be stored in a magnetic disk or a compact PCMCIA Flash RAM Card or dedicated memory within the electronic camera.

A shortcoming with prior electronic cameras is that data must be transmitted from the electronic camera to printer. Interfaces must be present to transfer the data. As disclosed in U.S. Pat. No. 5,032,911, printers that write to light sensitive media print must have a structure within the printer that operate on received data and convert the data into modulated light to mark the photosensitive sheet.

A further shortcoming in prior applications filed in association with this application is that complex optics and shuttering structures must be incorporated into the printer to protect the light sensitive media. Furthermore, several of the prior applications required electronic synchronization between the camera and the printer to control media exposure.

SUMMARY OF THE INVENTION

It is an object of the present invention to make use of an electronic image display in an electronic camera to image directly onto light sensitive sheets which are effective to provide a hard copy.

These objects are achieved by an apparatus for capturing and printing images on photosensitive sheets, comprising:
  a) an electronic camera having
    i) a display; and
    ii) image sensor means for producing a digital image of a subject;
    iii) means responsive to the digital image for displaying an image on the display;
  b) a printer including light tight storage means for receiving the photographic sheets and means for receiving the electronic camera; and
  c) optical means for focusing the image on the display along a single optical path onto a photosensitive sheet at an exposure position including:
    i) a shutter member having a shutter aperture and means for controlling the aperture to cause light from the display image to illuminate the photosensitive sheet.

ADVANTAGES

A feature of this invention is that a camera display is used to directly write onto the light sensitive sheet. A simple, inexpensive shuttering mechanism protects and exposes the media. Moreover, the printer does not require electronic interconnect between camera and printer to expose the media. Nothing is required to manipulate the data on the display or to modulate the display illuminator to expose the media.

DETAILED DESCRIPTION OF THE INVENTION

The invention is directed to a compact printer used in conjunction with electronic cameras. Such cameras often have a flat panel color display that is used to frame and/or review capture images. Separable printers exist that receive data from said electronic capture devices. Typically, interface electronics is disposed in each device and data is transmitted from the electronic camera to the printer.

Figure 1:
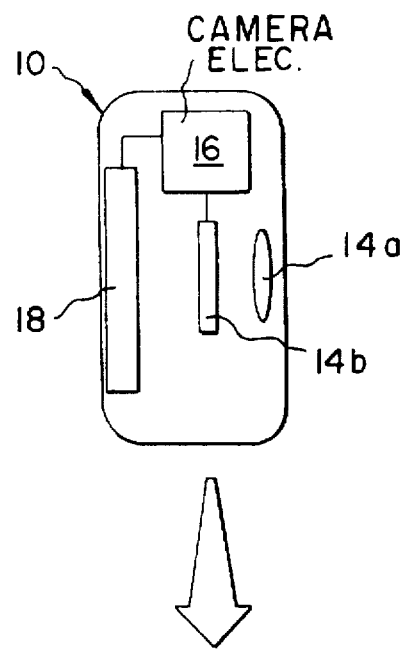
FIG. 1 is a side sectional view of a electronic camera in accordance with the present invention.
Figure 2:
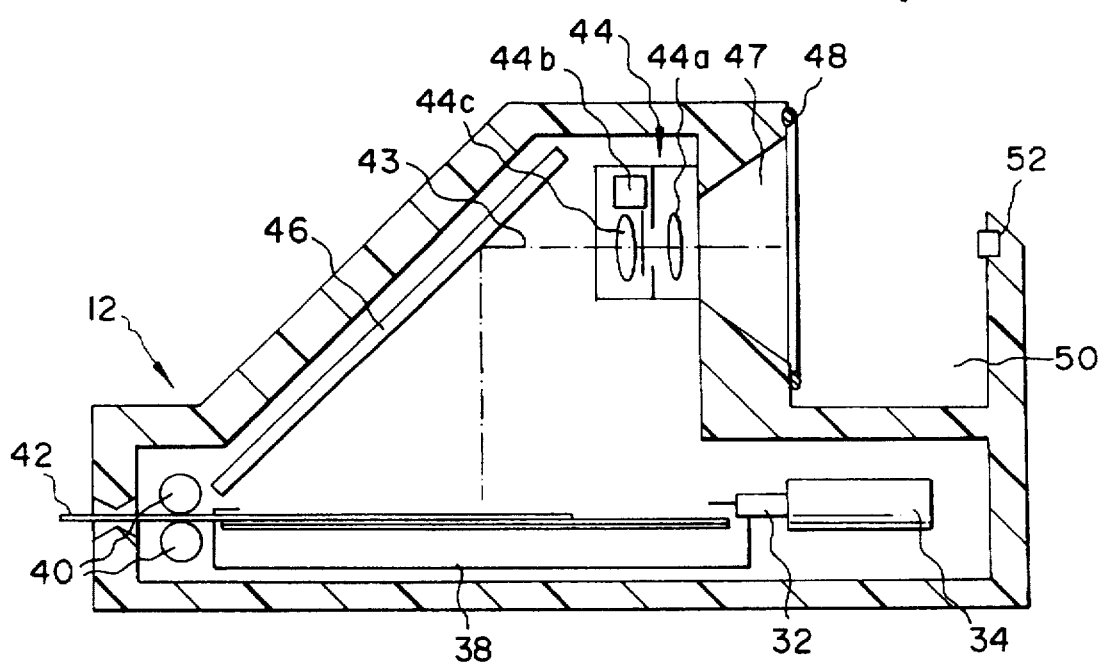
FIG. 2 is a side sectional view of the printer which is adapted to support the electronic camera of FIG. 1 in accordance with the present invention.

Turning now to FIG. 1, an electronic camera 10 is shown, and to FIG. 2, where a printer 12 is shown. Electronic camera 10 is of conventional design and can capture either still or motion images. The electronic camera 10 is adapted to electronically store an image of a subject and has a display 18 for displaying such stored image. An image of a subject is focused by a lens 14a in the camera head onto an image sensor 14b. The image sensor can be, for example, an area image sensor either of full frame or interline design. The image captured by the image sensor 14b is converted to a digital image and transferred to camera electronics 16 in a conventional matter as is well understood in the art. Camera electronics 16 causes an image corresponding to the digital image to be shown on a display 18. Such type of structure is also well known in the art. Camera display 18 can be, for instance, a LCD or organic polymer display system of conventional design.

Figure 3:
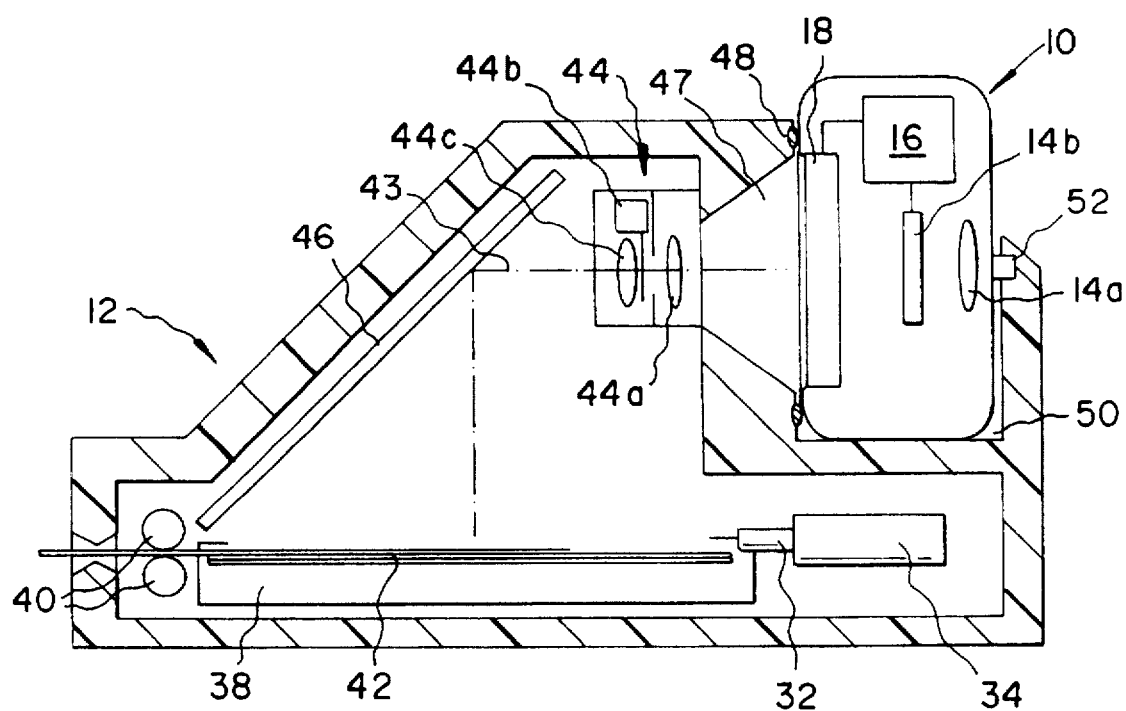
FIG. 3 is a side sectional view showing the printer of FIG. 2 supporting the electronic camera of FIG. 1.

The printer 12 includes a light tight storage structure for receiving a stack of photosensitive sheets disposed relative to a printer opening 47. The printer 12 has a camera receiving socket 50 which permits the camera 10 to be secured within printer 12. FIG. 3 shows electronic camera 10 inserted into camera receiving socket 50. Compliant member 52 presses electronic camera 10 against the structure forming printer opening 47. A gasket, 48 forms a light-tight seal between electronic camera 10 and printer 12. The image is directed onto the surface of photosensitive sheet 42 through mirror 46.

Printer 12 contains a stack of media sheets 38. These sheets are light sensitive and are loaded into the camera and stored in light sensitive manner as is known in the art. Photosensitive sheets can be found in current art as instant silver-halide sheets or pressure sensitive microencapsulated crushable color particles such as disclosed in U.S. Pat. Nos. 4,768,050, 5,049,902, and 5,122,432. Alternatively, images can be stored on photographic film and then stored and chemically processed at a later time.

After an electronic camera 10 is inserted into the printer 12, a shutter 44b is placed in an enabled mode. Light from the displayed image passes through a first lens 44a through the shutter aperture and through a second lens 44c. Light from the display 18 is directed along a single optical path 43 onto a photosensitive sheet at an exposure position. A mirror 46 receives light from the lens 44c and directs it downwardly onto the surface of a photographic sheet 42. Stated differently, light from the camera display 18 passes through a printer opening 47 and is focused by the lenses 44a and 44c upon a photosensitive sheet 42 at the exposure position within the printer 12. The design of the lens and shutter can be conventional. It is highly effective to have the lenses 44a and 44c disposed so as to provide a magnification of the image on the camera display 18. The size of the magnified image can be selected to appropriately fill the desired print area of a photosensitive sheet 42.

Figure 4:
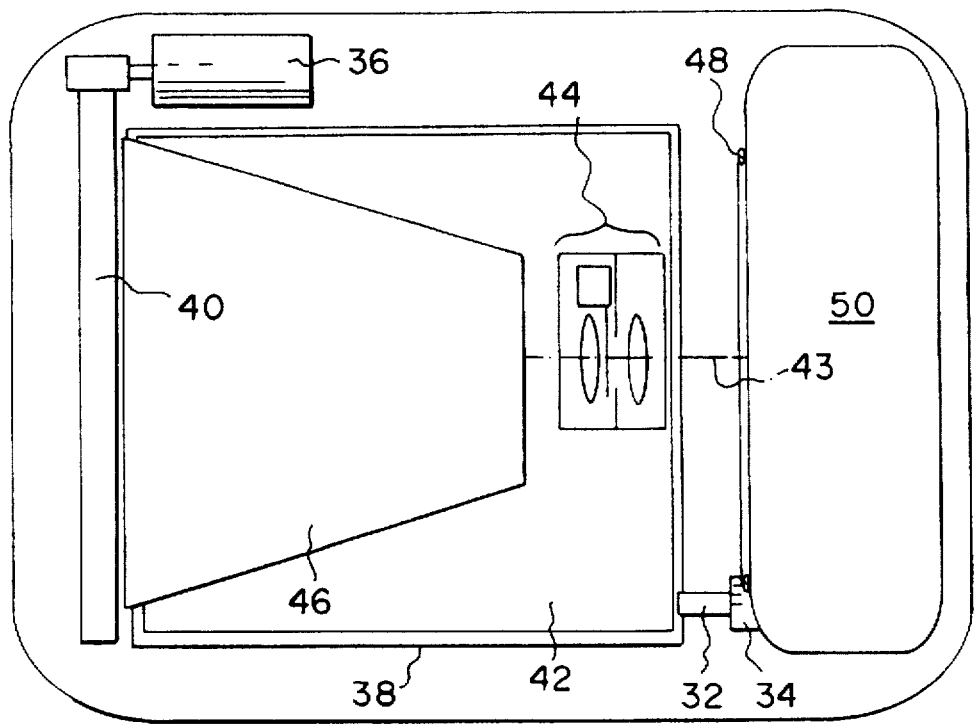
FIG. 4 is a top sectional view of the printer shown in FIG. 1.
Figure 5:
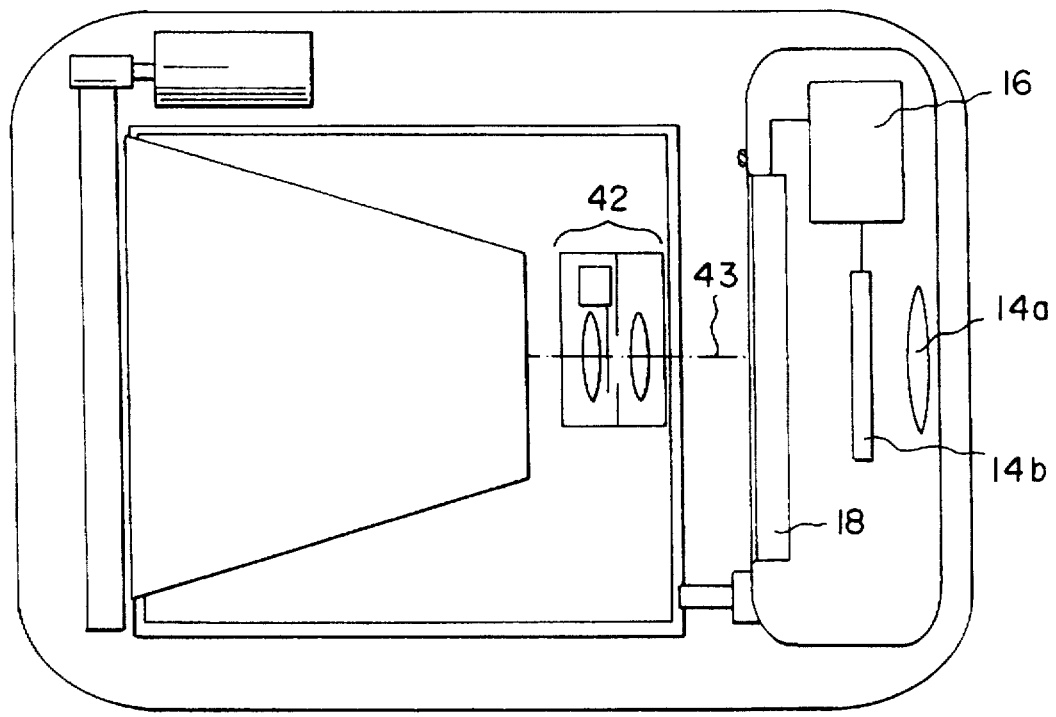
FIG. 5 is a top sectional view of the printer shown in FIG. 4 supporting the electronic camera shown in FIG. 1.

Shutter member 44b is of conventional design that is triggered by the operator to initiate an exposure-development sequence. The lenses 44a and 44c are positioned so that an image on camera display 18 is correctly focused on photosensitive sheet 42 when the shutter in lens-shutter 44 is opened. After exposure of photosensitive sheet 42, picker 32 is moved by picker drive 34 to urge photosensitive sheet 42 into processing rollers 40. FIG. 4 and 5 show a roller drive 36 that drives processing rollers 40 to process exposed photosensitive sheets 42.

FIG. 4 is a top view of printer 12 without electronic camera 10 inserted. Camera receiving socket 50 is sized to hold the body of electronic camera loosely. Compliant member 52 presses electronic camera 10 in registration with printer opening 47 when electronic camera 10 is loaded into camera receiving socket 50. The structure of camera receiving socket 50 and the body of electronic camera 10 are controlled to correctly align electronic camera 10 to photosensitive media 42.

In operation, after a camera 10 is inserted into the printer 12 and has a desired image produced on camera display 18, an operator signals printer electronics (not shown) to make a print. The printer electronics operates shutter 44b to expose a photosensitive sheet 42. Assuming the photosensitive sheets 42 are instant film or Cycolor sheets, after exposure the photosensitive sheet 42 is urged by picker 32 into processing rollers 40 to a part which apply appropriate force to photosensitive sheet 42 to deliver processing chemistry to the latent image. Processing rollers 40 are turned by process roller drive 26 to process the latent image formed on photosensitive sheet 42. Processing rollers 40 continue to operate until photosensitive sheet 42 has exited the printer 12.

In the case of silver halide instant film, a pod of chemicals at the beginning of photosensitive sheet 40 is burst by processing rollers 40. The chemicals are spread across the image of photosensitive sheet 42 as photosensitive sheet 42 passes through processing rollers 40. The chemicals operate on the latent image to create a permanent colored dye image on photosensitive sheet 42. In the case of crushable media (Cycolor), the rollers apply pressure to micro-beads containing the latent image. Burst micro-beads release dye chemistries onto photosensitive sheet 42 to create a permanent color image.

In one example, a test unit was built using a Kodak DC-25 electronic camera as electronic camera 10. A lens shutter assembly in the test unit was a lens shutter assembly from a Kodak Cameo camera. The Cameo lens has a 35 mm focal length, and the shutter is opened for two seconds to expose Polaroid instant film through a set of filters, not shown. The positioning of the lens shutter assembly relative to the camera display 18 and photosensitive sheet 42 was arranged to create a 3×magnification of the image on the display in the electronic camera. Acceptable pictures were generated.

The invention has been described in detail with particular reference to a certain preferred embodiment thereof, but it will be understood that variations and modifications can be effected within the spirit and scope of the invention. variations and modifications can be effected within the spirit and scope of the invention.

PARTS LIST 10 electronic camera
12 printer
14 camera head
14a camera lens
14b camera image sensor
16 camera electronics
18 camera display
32 picker
34 picker drive
36 roller drive
38 media cartridge
40 processing rollers
42 photosensitive sheet
43 optical path
44 lens-shutter
44 a first lens
44 b shutter
44c second lens
46 mirror
47 printer opening
48 gasket
50 camera receiving socket
52 compliant member

What is claimed is:

1. Apparatus for capturing and printing images on photosensitive sheets, comprising:
   a) an electronic camera having
      i) a display; and
      ii) image sensor means for producing a digital image of a subject;
      iii) means responsive to the digital image for displaying an image on the display;
   b) a printer including light tight storage means for receiving the photographic sheets and means for receiving the electronic camera; and
   c) optical means for imaging the display image onto a photosensitive sheet at an exposure position including:
      i) a shutter member having a shutter aperture and means for controlling the aperture to cause light from the display image to illuminate the photosensitive sheet.

2. Apparatus for capturing and printing images on photosensitive sheets, comprising:
   a) an electronic camera having
      i) a display; and
      ii) image sensor means for producing a digital image of a subject;
      iii) means responsive to the digital image for displaying an image on the display;

b) a printer including light tight storage means for receiving the photographic sheets and means for receiving the electronic camera; and c) optical means for focusing the image on the display along a single optical path onto a photosensitive sheet at an exposure position including:

i) a shutter member having a shutter aperture and means for controlling the aperture to cause light from the display image to illuminate the photosensitive sheet.

3. The apparatus of claim 2 wherein the optical means includes a mirror disposed in the single optical path for reflecting light which passes through the shutter onto the exposure sheet at the exposure position.

4. The apparatus of claim 2 wherein the optical means further includes lens elements disposed on either side of the shutter member.

5. The apparatus of claim 2 wherein the optical means further includes one or more lens elements arranged to provide a desired magnification of the image on the display when it is focused onto a photosensitive sheet at the exposure position.

\* \* \* \* \*